United States Patent
Li et al.

(10) Patent No.: US 11,235,552 B2
(45) Date of Patent: Feb. 1, 2022

(54) THERMAL INSULATION MATERIALS AND METHODS THEREOF

(71) Applicant: 3M INNOVATIVE PROPERTIES COMPANY, St. Paul, MN (US)

(72) Inventors: MingZhu Li, Shanghai (CN); Pingfan Wu, Woodbury, MN (US); Tien Tsung Wu, Woodbury, MN (US); Eumi Pyun, St. Paul, MN (US); Zhong Hai Cai, Shanghai (CN); QiSheng Pan, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/058,258

(22) PCT Filed: Jul. 23, 2018

(86) PCT No.: PCT/CN2018/096648
§ 371 (c)(1),
(2) Date: Nov. 24, 2020

(87) PCT Pub. No.: WO2020/019114
PCT Pub. Date: Jan. 30, 2020

(65) Prior Publication Data
US 2021/0197520 A1    Jul. 1, 2021

(51) Int. Cl.
*B32B 5/26*    (2006.01)
*B32B 7/027*    (2019.01)
(Continued)

(52) U.S. Cl.
CPC .............. *B32B 5/26* (2013.01); *B32B 5/022* (2013.01); *B32B 5/024* (2013.01); *B32B 7/027* (2019.01);
(Continued)

(58) Field of Classification Search
CPC .. B32B 7/27; B32B 5/022; B32B 5/26; B32B 5/27; B32B 5/24; B32B 2250/03;
(Continued)

(56) References Cited

U.S. PATENT DOCUMENTS 3,664,907 A    5/1972    Price
4,837,076 A    6/1989    McCullough, Jr.
(Continued)

FOREIGN PATENT DOCUMENTS

CN    103347568 A    10/2013
CN    1033475678 A    10/2013
(Continued)

OTHER PUBLICATIONS

Stern EWS, Engineered Substrates, Polyester Fiber, accessed online May 21, 2021.*
(Continued)

*Primary Examiner* — Camie S Thompson
(74) *Attorney, Agent, or Firm* — Philip P. Soo

(57) ABSTRACT

Provided is a multilayer thermal insulator and related method that use a non-woven core layer comprising non-meltable and flame-resistant polymeric fibers. One or more scrims are disposed on the opposing major surfaces of the non-woven core layer, and a peripheral edge of the one or more scrims is either edge sealed or capable of being edge sealed to substantially encapsulate the non-woven core layer within the one or more scrims. Optionally, a binder is provided on the scrims or non-woven core layer to facilitate edge sealing. The provided insulators are essentially dust-free and capable of passing stringent flammability standards.

16 Claims, 2 Drawing Sheets

(51) Int. Cl.
  *B32B 5/02* (2006.01)
  *B32B 7/12* (2006.01)
(52) U.S. Cl.
  CPC ............ *B32B 7/12* (2013.01); *B32B 2250/03* (2013.01); *B32B 2250/20* (2013.01); *B32B 2250/40* (2013.01); *B32B 2255/02* (2013.01); *B32B 2255/26* (2013.01); *B32B 2262/0276* (2013.01); *B32B 2262/106* (2013.01); *B32B 2307/304* (2013.01); *B32B 2307/3065* (2013.01); *B32B 2605/00* (2013.01)
(58) Field of Classification Search
  CPC ............ B32B 2250/20; B32B 2250/40; B32B 2255/02; B32B 2255/26; B32B 2262/0276; B32B 2262/106; B32B 2307/04; B32B 2307/3065; B32B 2605/00; D04H 1/43; Y10S 428/92; Y10S 428/921; Y10S 428/159; Y10S 428/16; Y10T 442/16; Y10T 442/682; Y10T 442/659; Y10T 442/3789; Y10T 442/494; G10K 11/168
  USPC .. 442/13, 14, 27, 45, 356, 357, 389, 35, 36, 442/50, 57, 58, 26, 11, 24, 25, 32, 2, 274, 442/402, 319, 381, 278; 428/920, 921; 156/60; 181/286; 427/412
  See application file for complete search history.

(56) References Cited

U.S. PATENT DOCUMENTS

| | | | |
|---|---|---|---|
| 4,879,168 A | 11/1989 | McCullough, Jr. | |
| 4,880,168 A | 11/1989 | Randall, Jr. | |
| 4,897,303 A | 1/1990 | McCullough, Jr. | |
| 5,159,700 A | 12/1992 | Meier | |
| 6,617,002 B2 | 9/2003 | Wood | |
| 6,670,291 B1 | 12/2003 | Tompkins | |
| 6,808,664 B2 | 10/2004 | Falk | |
| 6,977,109 B1 | 12/2005 | Wood | |
| 7,284,283 B2 | 10/2007 | Mack | |
| 7,491,354 B2 | 2/2009 | Andersen | |
| 7,731,878 B2 | 6/2010 | Wood | |
| 7,757,811 B2 | 7/2010 | Fox | |
| 10,180,415 B2 | 1/2019 | Mertins | |
| 2004/0198125 A1 | 10/2004 | Mater | |
| 2006/0141918 A1 | 6/2006 | Rienke | |
| 2008/0121461 A1* | 5/2008 | Gross | D04H 1/43828 181/286 |
| 2011/0111163 A1 | 5/2011 | Bozouklian | |
| 2011/0151737 A1 | 6/2011 | Moore | |
| 2013/0112499 A1* | 5/2013 | Kitchen | B32B 5/26 181/296 |
| 2014/0024279 A1 | 1/2014 | Berrigan | |
| 2014/0308505 A1 | 10/2014 | Schmitt | |
| 2015/0151510 A1 | 6/2015 | Handermann | |
| 2015/0233030 A1 | 8/2015 | Liba | |
| 2015/0283960 A1 | 10/2015 | Kim | |
| 2016/0311205 A1 | 10/2016 | Fernando | |
| 2018/0187351 A1 | 7/2018 | Tsuchikura | |

FOREIGN PATENT DOCUMENTS

| | | |
|---|---|---|
| EP | 1 091 038 A2 | 4/2001 |
| JP | 2001-21094 | 1/2001 |
| JP | 2002-302861 | 10/2002 |
| JP | 2002-333092 | 11/2002 |
| JP | 2015-068485 | 9/2013 |
| WO | WO 1995/005101 | 2/1995 |
| WO | WO 1995/06449 | 3/1995 |
| WO | WO 2006/110718 | 10/2006 |
| WO | WO 2008/071604 A1 | 6/2008 |
| WO | WO 2015/021098 | 2/2015 |
| WO | WO 2017/084721 | 5/2017 |
| WO | WO 2019/090659 | 5/2019 |

OTHER PUBLICATIONS

Silver Bobbin, Is Polyester Flammable? Doesit Melt or Burn?, accessed online Sep. 23, 2021.*

Dar, Yuan-Huffman, Shah, Huang, and Xiao, "Thermally activated pressure-sensitive adhesives", *J. Adhesion Sci. Technol.*, vol. 21, No. 16, pp. 1645-1658 (2007).

International Search Report for PCT/CN2018/096648 dated Apr. 9, 2019 (5 pages).

* cited by examiner

THERMAL INSULATION MATERIALS AND METHODS THEREOF

CROSS REFERENCE TO RELATED APPLICATIONS

This application is a national stage filing under 35 U.S.C. 371 of PCT/CN2018/096648, filed Jul. 23, 2018, the disclosure of which is incorporated by reference in its entirety herein.

FIELD OF THE INVENTION

Provided are articles for use in thermal insulation. The provided articles may be used as thermal insulators in automotive and aerospace applications, such as battery compartments for electric vehicles.

BACKGROUND

The importance of thermal management in electric vehicles cannot be overstated. Temperature has a profound effect on the performance and serviceable lifetime of lithium ion batteries. Freezing temperatures decrease vehicle acceleration and impact driving range. On the other extreme, high temperatures are also detrimental because such temperatures can result in power fade and degrade battery life. Consumers have come to expect that such batteries will perform nominally for many years when used in a wide range of geographies and climates.

A passive thermal insulator can substantially boost the efficiency of a lithium ion battery. Lithium ion batteries are known for having high power densities, but are limited by their narrow working temperature range. For example, working temperatures can be managed by a chiller that activates when battery temperature exceeds a certain temperature (e.g., 45° C.) and an electrical heater that activates when the temperature falls below a certain temperature (e.g., 15° C.). Heating and cooling devices can be powered by a lead-acid battery or other conventional batter to maintain the lithium battery pack within optimal temperatures. A great deal of energy can be required to warm up, or cool, the battery pack. A passive thermal insulator can greatly reduce this energy expenditure.

Engineering thermal management solutions can be complicated by safety implications. In some countries, regulations require that an electric vehicle needs to reach certain mileage milestones for a single charge and battery power density to qualify for government incentives. Yet, high power densities can increase the risk of a battery component catching fire. As a result, components of the battery and the compartment around the battery are required to be flame resistant. For passive thermal insulation materials, for example, manufacturers require that these materials pass the UL94-V0 flammability test.

SUMMARY

Oxidized polyacrylonitrile ("OPAN") has various physical properties that make it suitable for passive insulation applications, since it can be formed into lofty fibrous structures and is non-flammable. One technical issue related to OPAN relates to its tendency to "shed" fibers. Fiber shedding is not only a contamination concern but also aesthetically problematic because OPAN fibers are black in color making them very visually prominent even in tiny quantifies. This is a problem for not only OPAN fibers but also other fibers that are non-meltable, because such fibers do not naturally weld or bond to each other when formed into a web, and thus easily become airborne.

One way to solve the problem of fiber shedding is to seal the OPAN fibers between an outer lining that traps the fibers and prevents them from becoming airborne. In a manufacturing process, this could be accomplished by edge sealing—for example, using a hot press to melt the edge and solidify the web in the thickness direction. This is not possible with OPAN fibers, which do not melt, but can be achieved using a material that is both heat-sealable and flame resistant.

Provided herein are nonwoven articles with an OPAN core layer confined between a pair of flame-resistant scrims that enable the insulator to be heat sealed along its edge. Advantageously, the encapsulated article can be made to be substantially dust free, or have substantially no fiber shedding. Further, the encapsulated article can pass the UL-94 V0 flammability standard, and is technically suitable for use in electric vehicle applications.

In a first aspect, a multilayer thermal insulator is provided. The multilayer thermal insulator comprises: a non-woven core layer comprising non-meltable, flame-resistant polymeric fibers; and one or more scrims disposed on opposing major surfaces of the non-woven core layer, wherein a peripheral edge of the one or more scrims is either edge sealed or capable of being edge sealed to substantially encapsulate the non-woven core layer within the one or more scrims.

In a second aspect, a battery assembly for an electric vehicle is provided comprising the multilayer thermal insulator.

In a third aspect, a method of making a multilayer thermal insulator containing a non-woven core layer comprising non-meltable, polymeric fibers is provided, the method comprising: disposing a scrim along each major surface of the non-woven core layer; and edge sealing a peripheral edge of the scrim(s) to substantially encapsulate the non-woven core layer within the scrim(s).

Figure 1:
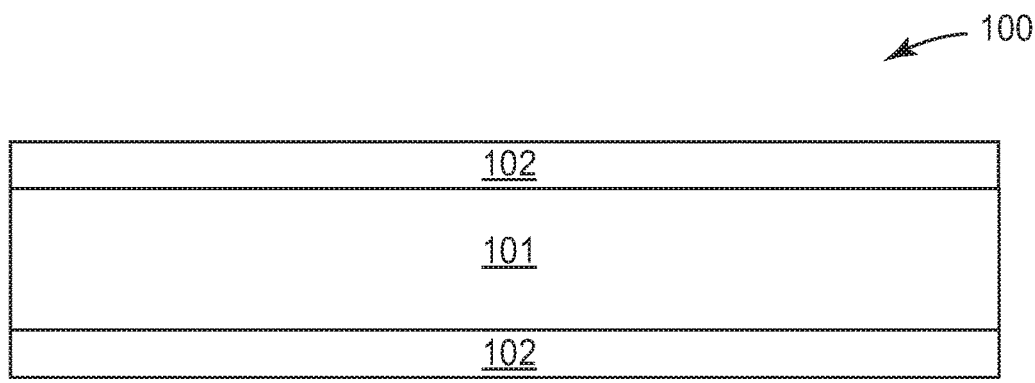
FIG. 1 is a side cross-sectional views of a multilayer thermal insulator prior to being heat sealed.

Repeated use of reference characters in the specification and drawings is intended to represent the same or analogous features or elements of the disclosure. It is understood that numerous other modifications and embodiments can be devised by those skilled in the art, which fall within the scope and spirit of the principles of the disclosure. The figures are not drawn to scale.

Definitions

As used herein:
"ambient conditions" means at 25° C. and 101.3 kPa pressure;
"average" means number average, unless otherwise specified;
"copolymer" refers to polymers made from repeat units of two or more different polymers and includes random, block and star (e.g. dendritic) copolymers;

"average fiber diameter" of fibers in a non-woven core layer is determined by producing one or more images of the fiber structure, such as by using a scanning electron microscope; measuring the transverse dimension of clearly visible fibers in the one or more images resulting in a total number of fiber diameters; and calculating the average fiber diameter based on that total number of fiber diameters;

"non-woven core layer" means a plurality of fibers characterized by entanglement or point bonding of the fibers to form a sheet or mat exhibiting a structure of individual fibers or filaments which are interlaid, but not in an identifiable manner as in a knitted fabric;

"polymer" means a relatively high molecular weight material having a molecular weight of at least 10,000 g/mol;

"size" refers to the longest dimension of a given object or surface;

"substantially" means to a significant degree, as in an amount of at least 30%, 40, 50, 60, 70, 80, 90, 95, 96, 97, 98, 99, 99.5, 99.9, 99.99, or 99.999%, or 100%; and "thickness" means the distance between opposing sides of a layer or multilayer article.

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the particular drawing. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Where applicable, trade designations are set out in all uppercase letters.

Multilayer Constructions

An unsealed thermal insulator according to one embodiment is shown in FIG. 1 and hereinafter referred to by the numeral 100. The unsealed thermal insulator 100 includes a non-woven core layer 101 disposed between a pair of scrims 102, 102. As shown, the scrims 102, 102 are diametrically opposed, with each scrim 102 extending across and directly contacting the non-woven core layer 101.

In this case, the two scrims 102, 102 do not contact each other at any point. In some embodiments, the scrims 102, 102 could be joined to each other along one or more peripheral edges of the unsealed thermal insulator 100 to form an envelope, or pouch, within which the non-woven core layer 101 resides.

As a further possibility not shown in FIG. 1, the scrims 102, 102 themselves could represent two halves of a single scrim that is folded over along one peripheral edge of the unsealed thermal insulator 100, with the non-woven core layer 101 disposed between the two halves.

Figure 2:
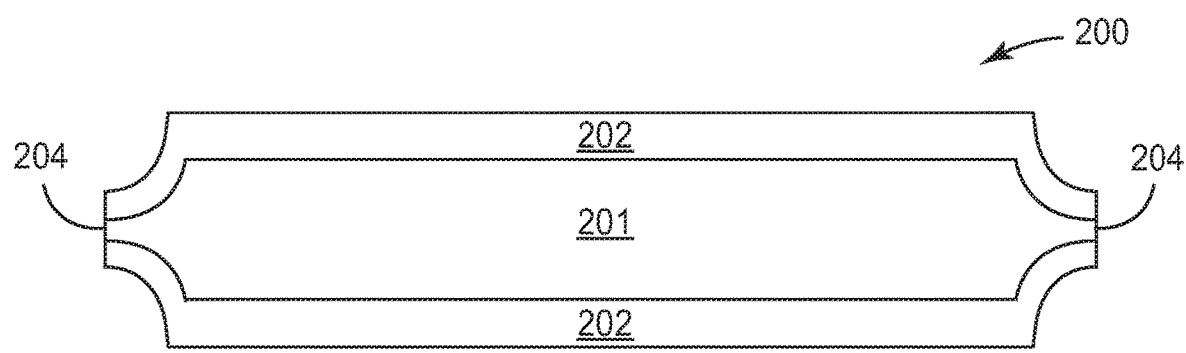
FIGS. 2-3 are side cross-sectional views of respective multilayer thermal insulators after being heat sealed.

FIG. 2 shows a thermal insulator 200 obtained by edge sealing the unsealed thermal insulator 100 of FIG. 1. Like the thermal insulator 100, the thermal insulator 200 is comprised of a non-woven core layer 201 of non-meltable fibers, where the non-woven core layer 201 is sandwiched between a pair of scrim layers 202. As shown in this figure, the peripheral edges 204, 204 of the thermal insulator 200 are permanently compressed, or edge sealed. Edge sealing substantially encapsulates the non-woven core layer 201, along with any loose fibers therein, between the pair of scrim layers 202. Advantageously, only the edges can be sealed, thus avoiding the degradation in insulation performance that might be caused by compressing large areas of the thermal insulator 200.

The peripheral edges of the scrims 202, 202 can be joined using any known method. One method is heat sealing, where heat and pressure is applied to outer-facing surfaces of the scrims 202, 202 to compress and force out voids in both the scrims 202, 202, and the non-woven core layer 201 to form a seal. Alternatively, edge sealing can be achieved by cold welding, a process in which two surfaces join without any liquid or molten phase being present at the joint. As yet another alternative, edge sealing can take place adhesively, where a liquid adhesive fills the interstices within the scrims 202, 202 and the non-woven core layer 201 along the edge seal. Each method can effectively prevent escape of loose fibers.

The non-woven core layer and scrims need not be mutually coextensive. For example, the scrims 102, 102 can be made larger in area than the non-woven core layer 101 such that the peripheral edges of the scrims 102, 102 do not overlap with the peripheral edge of the non-woven core layer 101. The peripheral edge may extend along the entire perimeter of the thermal insulator 100 and include the scrims 102, 102 but exclude the non-woven core layer 101. Advantageously, this allows the peripheral edges of the scrims 102, 102 to be edge sealed in a way that prevents fibers from the non-woven core layer 101 from being exposed on the outer surface of the finished product.

Figure 3:
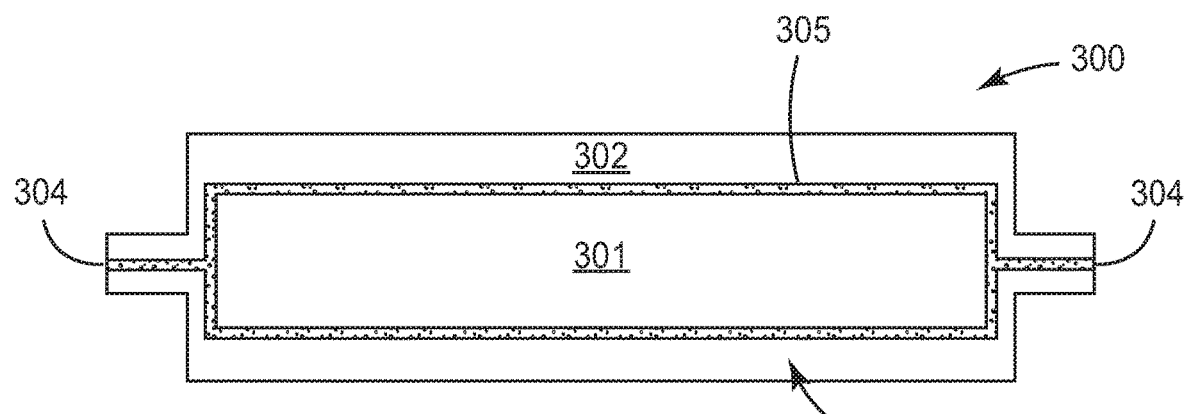

FIG. 3 shows a sealed thermal insulator 300 with an added feature to prevent shifting or sliding of the layers of the thermal insulator relative to each other. Here, the thermal insulator 300 has a non-woven core layer 301 sandwiched between a pair of scrims 302, 302 as shown in the previous embodiment. The scrims 302, 302 have peripheral edges 304 that extend beyond those of the non-woven core layer 301, with the thermal insulator 300 edge sealed along these peripheral edges 304.

Unlike the previous embodiment, the thermal insulator 300 additionally includes an adhesive layer 305 that bonds the non-woven core layer 301 and scrims 302, 302 to each other, as shown. The adhesive layer 305 prevents sliding movement between the non-woven core layer 301 and scrims 302, 302. The adhesive layer 305 enables the thermal insulator 300 to be edge sealed using the adhesive layer 305 alone, without need for a separate binder.

The adhesive layer 305 can be comprised of any suitable adhesive. Suitable adhesives can include heat-activated adhesives containing polyurethanes or acrylates. In some embodiments, the adhesive is stimuli-responsive. For example, the adhesive layer 305 can be initially non-tacky, enabling it to be stored unprotected by a release liner, but become tacky upon activation by heat. Exemplary materials are described in Y. L. Dar, W. Yuan-Huffman, S. Shah, and A. Xiao, J. Adhesion Sci. Technol., 21, 1645 (2007). The adhesives can also blended with flame retardant agents such as bromine, phosphate, and iodine salts.

Various factors can influence the mechanical properties of the provided multilayer constructions, including fiber dimensions, the presence of any binding sites on the reinforcing fibers, fiber entanglements, and overall bulk density. Tensile strength and tensile modulus are metrics by which the properties of the non-woven core layer may be characterized.

The tensile modulus is generally indicative of the stiffness of the material and can be from 7 kPa to 1400 kPa, 70 kPa to 550 kPa, 140 kPa to 350 kPa, or in some embodiments, less than, equal to, or greater than 5 kPa, 7, 10, 15, 20, 25, 30, 40, 50, 60, 70, 80, 90, 100, 120, 140, 150, 200, 250, 300, 350, 400, 450, 500, 550, 600, 700, 800, 900, 1000, 1100, 1200, 1300, or 1400 kPa. Tensile strength represents the resistance of the non-woven core layer to tearing or permanently distorting and can be at least 28 kPa, at least 32 kPa, at least 35 kPa, or in some embodiments, less than, equal to, or greater than 28 kPa, 29, 30, 31, 32, 33, 34, 35, 36, 37, 38, 39, 40, 42, 44, 45, 47, or 50 kPa.

The provided thermal insulators may optionally include additional layers not shown in FIGS. 1-3. To assist in installation, for example, any of these exemplary thermal insulators may further include an outer adhesive layer, such as a pressure-sensitive adhesive layer or other attachment layer or fastening mechanism. Such a layer can extend across and contact one or both scrims, or any other outward-facing surface of the thermal insulator. As another possibility, any of these insulators may include a solid thermal barrier such as an aluminum sheet or foil layer adjacent to the non-woven core layer. For some applications, one or more acoustically insulating layers may also be coupled to the non-woven core layer.

Thermal insulation can be installed using any suitable method. The provided thermal insulators are not only conformable but are capable of being compressed and expanded to fill the cavities, or enclosures, in which they are housed. Enclosures used in electric vehicle applications may, in some instances, have thickness variations in the range of from 10% to 100% relative to the largest thickness dimension of the enclosure. The provided thermal insulators may, in an exemplary installation, be placed in compression within such an enclosure, and then allowed to expand and substantially fill the enclosure.

The resilience of these materials can be characterized based on their dimensional recovery shortly after being compressed. In preferred embodiments, for example, the thickness recovers to at least 70%, 72, 75, 77, 80, 82, 85, 87, 90, 92, or 95% of its original thickness 5 minutes after being compressed to 37% of its original thickness at ambient conditions.

Various components of the multilayered thermal insulators are described in more detail in the subsections that follow.

Non-Woven Core Layer

The non-woven core layer is comprised of a plurality of non-meltable polymeric fibers. These are fibers made from a polymer that does not become a liquid at any temperature. In some cases, these polymers do not melt because they oxidize first when heated in the presence of air. The non-meltable polymeric fibers can include carbon fibers, carbon fiber precursors, or a combination thereof.

Carbon fiber precursors include oxidized acrylic precursors, such as oxidized polyacrylonitrile. Polyacrylonitrile is a useful acrylic precursor that can be used widely to produce the carbon fibers. In some embodiments, the polyacrylonitrile contains more than 70 wt %, more than 75 wt %, more than 80 wt %, or more than 85 wt % of acrylonitrile repeat units.

Non-meltable polymeric fibers further include dehydrated cellulosic precursors such as rayon. Non-meltable polymeric fibers further include lignin fibers. Lignin is a complex polymer of aromatic alcohols known as monolignols, and is derived from plants. Monolignol monomers include p-coumaryl alcohol, coniferyl alcohol, and sinapyl alcohol, which are methoxylated to varying degrees relative to each other.

Non-meltable polymeric fibers also include certain thermoset materials, such as epoxy, polyimide, melamine, and silicone.

Natural fibers, such as cotton, linen, hemp, silk, and animal airs, burn before melting. Rayon is the artificial silk made from cellulose, which can have a chemical structure such as Structure I below. When cellulose burns, it produces carbon dioxide and water and also forms a char. Such a combustion reaction can be represented, for example, by the following reaction: $C_6H_{10}O_5 + 6\ O_2 \rightarrow 6\ CO_2 + 5\ H_2O$.

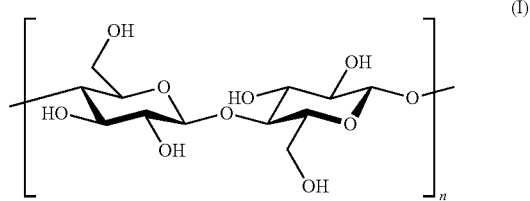

(I)

Carbon fiber precursors also include pitch-based precursors. Pitches are complex blends of polyaromatic molecules and heterocyclic compounds, which can be used as precursors of carbon fibers or carbon fillers in carbon composites. Vinylidene chloride and phenolic resins can, in some embodiments, also be precursors for manufacture of carbon fibers.

In an exemplary embodiment, the non-meltable fibers are comprised of oxidized polyacrylonitrile fibers. The oxidized polyacrylonitrile fibers can include, for example, those available under the trade designations PYRON (Zoltek Corporation, Bridgeton, Mo.) and PANOX (SGL Group, Meitingen, Germany).

The oxidized polyacrylonitrile fibers derive from precursor fibers containing a copolymer of acrylonitrile and one or more co-monomers. Useful co-monomers include, for example, methyl methacrylate, methyl acrylate, vinyl acetate, and vinyl chloride. The co-monomer(s) may be present in an amount of up to 15 wt %, 14 wt %, 13 wt %, 12 wt %, 11 wt %, 10 wt %, 9 wt %, or 8 wt %, relative to the overall weight of the monomer mixture prior to copolymerization.

Oxidation of the precursor fibers can be achieved by first stabilizing the precursor fibers at high temperatures to prevent melting or fusion of the fibers, carbonizing the stabilized fibers to eliminate the non-carbon elements and finally a graphitizing treatment at even higher temperatures to enhance the mechanical properties of the non-woven fibers. Oxidized polyacrylonitrile fibers, as referred to herein, include polyacrylonitrile fibers that are either partially or fully oxidized.

In some embodiments, the plurality of non-meltable polymeric fibers is stabilized. Stabilization can be carried out by controlled heating of the precursor fiber in air or some other oxidizing atmosphere. Oxidation typically takes place at temperatures in the range of from 180° C. to 300° C., with a heating rate of from 1-2° C. per minute. If desired, the precursor fibers can undergo further processing to reduce shrinkage. Shrinkage of the precursor fibers can be reduced by stretching the fibers along their axis during the low-temperature stabilization treatment. Such stretching can produce oxidized polyacrylonitrile fibers with a high degree of preferred orientation along the fiber axis. The stabilization process produces changes in chemical structure of the acrylic precursor whereby the material becomes thermally stable to subsequent high temperature treatments. During this process, the fibers change in color to black. The black fibers are carbonized in an inert atmosphere at high temperatures, typically from 1000° C. to 1500° C., at a slow heating rate to avoid damage to the molecular order of the fiber. The fibers are given a graphitizing treatment at high temperatures for example, above 2000° C. to 3000° C. to improve the texture of the fiber and to enhance the tensile modulus of the non-woven core layer. If desired, the strength and the tensile modulus of the fibers can be further improved by stretching at elevated temperatures.

More generally, the non-meltable polymeric fibers used in the non-woven core layer can have a fiber diameter and length that enables the fibers to become entangled within the non-woven core layer. The fibers, however, are preferably not so thin that web strength is unduly compromised. The fibers can have an average fiber diameter of from 1 micrometers to 100 micrometers, from 2 micrometers to 50 micrometers, from 5 micrometers to 20 micrometers, or in some embodiments, less than, equal to, or greater than 1 micrometer, 2, 3, 5, 7, 10, 15, 20, 25, 30, 40, 50, 60, 70, 80, 90, or 100 micrometers.

Inclusion of long fibers can reduce fiber shedding and further enhance strength of the non-woven core layer along transverse directions. The non-meltable polymeric fibers can have a median fiber length of from 10 millimeters to 100 millimeters, from 15 millimeters to 100 millimeters, from 25 millimeters to 75 millimeters, or in some embodiments, less than, equal to, or greater than 10 millimeters, 12, 15, 17, 20, 25, 30, 35, 40, 45, 50, 55, 60, 65, 70, or 75 millimeters.

The non-meltable polymeric fibers used to form the non-woven core layer can be prepared from bulk fibers. The bulk fibers can be placed on the inlet conveyor belt of an opening/mixing machine in which they can be teased apart and mixed by rotating combs. The fibers are then blown into web-forming equipment where they are formed into a dry-laid non-woven core layer.

As an alternative, a SPIKE air-laying forming apparatus (commercially available from FormFiber NV, Denmark) can be used to prepare nonwoven fibrous webs containing these bulk fibers. Details of the SPIKE apparatus and methods of using the SPIKE apparatus in forming air-laid webs are described in U.S. Pat. No. 7,491,354 (Andersen) and U.S. Pat. No. 6,808,664 (Falk et al.).

Bulk fibers can be fed into a split pre-opening and blending chamber with two rotating spike rollers with a conveyor belt. Thereafter, the bulk fibers are fed into the top of the forming chamber with a blower. The fibrous materials can be opened and fluffed in the top of the chamber and then fell through the upper rows of spikes rollers to the bottom of the forming chamber passing thereby the lower rows of spike rollers. The materials can then be pulled down on a porous endless belt/wire by a combination of gravity and vacuum applied to the forming chamber from the lower end of the porous forming belt/wire.

Alternatively, the non-woven core layer can be formed in an air-laid machine. The web-forming equipment may, for example, be a RANDO-WEBBER device commercially-available from Rando Machine Co., Macedon, N.Y. Alternatively, the web-forming equipment could be one that produces a dry-laid web by carding and cross-lapping, rather than by air-laying. The cross-lapping can be horizontal (for example, using a PROFILE SERIES cross-lapper commercially-available from ASSELIN-THIBEAU of Elbeuf sur Seine, 76504 France) or vertical (for example, using the STRUTO system from the University of Liberec, Czech Republic or the WAVE-MAKER system from Santex AG of Switzerland).

The oxidized polyacrylonitrile fibers can be present in any amount sufficient to provide the thermal insulator with the desired flame resistance and insulating properties. The oxidized polyacrylonitrile fibers can be present in an amount of from 60 wt % to 100 wt %, 70 wt % to 100 wt %, 81 wt % to 100 wt %, or in some embodiments, less than, equal to, or greater than 50 wt %, 55, 60, 65, 70, 75, 80, 85, 90, or 95 wt %, or less than or equal to 100 wt %.

In some embodiments, the non-woven core layer includes a multiplicity of fiber entanglements, where two or more discrete fibers become knotted or twisted together. The fibers within these entanglements, while not physically attached, can be so intertwined that they resist separation when pulled in opposite directions.

Entanglements can be induced by a needle tacking process or hydroentangling process. Advantageously, these processes can provide entanglements in which the fibers in the non-woven core layer are substantially entangled along directions perpendicular to the major surfaces of the non-woven core layer, thereby enhancing loft and increasing strength of the non-woven core layer along these directions.

The non-woven core layer can be entangled using a needle tacker commercially available under the trade designation DILO from Dilo of Germany, with barbed needles (commercially available, for example, from Foster Needle Company, Inc., of Manitowoc, Wis.) whereby the substantially entangled fibers described above are needle tacked fibers. Needle tacking, also referred to as needle punching, entangles the fibers perpendicular to the major surface of the non-woven core layer by repeatedly passing an array of barbed needles through the web and retracting them while pulling along fibers of the web.

The needle tacking process parameters, which include the type (or types) of needles used, penetration depth, and stroke speed, are not particularly restricted. Further, the optimum number of needle tacks per area of mat will vary depending on the application. Typically, the non-woven core layer is needle tacked to provide an average of at least 5 needle tacks/cm². Preferably, the mat is needle tacked to provide an average of about 5 to 60 needle tacks/cm², more preferably, an average of about 10 to about 20 needle tacks/cm².

Further options and advantages associated with needle tacking are described elsewhere, for example in U.S. Patent Publication Nos. 2006/0141918 (Rienke), 2011/0111163 (Bozouklian et al.), and International Patent Application No. PCT/CN2017/110372 (Cai et al.).

The non-woven core layer can also be hydroentangled using a conventional water entangling unit (commercially available from Honeycomb Systems Inc. of Bidderford, Me.; also see U.S. Pat. No. 4,880,168 (Randall, Jr.)). Although the preferred liquid to use with the hydroentangler is water, other suitable liquids may be used with or in place of the water.

In a water entanglement process, a pressurized liquid such as water is delivered in a curtain-like array onto a non-woven core layer, which passes beneath the liquid streams. The mat or web is supported by a wire screen, which acts as a conveyor belt. The mat feeds into the entangling unit on the wire screen conveyor beneath the jet orifices. The wire screen is selected depending upon the final desired appearance of the entangled mat. A coarse screen can produce a mat having perforations corresponding to the holes in the screen, while a very fine screen (e.g., 100 mesh) can produce a mat without the noticeable perforations.

In exemplary embodiments, the non-woven core layer has an average bulk density of from 15 kg/m³ to 50 kg/m³, 15 kg/m³ to 40 kg/m³, 20 kg/m³ to 30 kg/m³, or in some embodiments less than, equal to, or greater than 15 kg/m³, 16, 17, 18, 19, 20, 22, 24, 25, 26, 28, 30, 32, 35, 37, 40, 42, 45, 47, or 50 kg/m³.

Reinforcing Fibers

Optionally, the non-woven core layer includes both a plurality of oxidized polyacrylonitrile fibers blended with a plurality of secondary fibers known as reinforcing fibers. The reinforcing fibers may include binder fibers, which have a sufficiently low melting temperature to allow subsequent melt processing of the non-woven core layer. Binder fibers are generally polymeric, and may have uniform composition or contain two or more components. In some embodiments, the binder fibers are bi-component fibers comprised of a core polymer that extends along the axis of the fibers and is surrounded by a cylindrical shell polymer. The shell polymer can have a melting temperature less than that of the core polymer.

As used herein, however, "melting" refers to a gradual transformation of the fibers or, in the case of a bi-component shell/core fiber, an outer surface of the fiber, at elevated temperatures at which the polyester becomes sufficiently soft and tacky to bond to other fibers with which it comes into contact, including non-meltable fibers and any other binder fibers having its same characteristics and, as described above, which may have a higher or lower melting temperature.

Certain thermoplastic materials such as polyester can become tacky when melted, making them suitable materials for the outer surface of a binder fiber. Useful binder fibers have outer surfaces comprised of a polymer having a melting temperature of from 100° C. to 300° C., or in some embodiments, less than, equal to, or greater than, 100° C., 105, 110, 115, 120, 125, 130, 135, 140, 145, 150, 160, 170, 180, 190, 200, 210, 220, 230, 240, 250, 260, 270, 280, 290, or 300° C.

Binder fibers increase structural integrity in the thermal insulator by creating a three-dimensional array of nodes where constituent fibers are physically attached to each other. These nodes provide a macroscopic fiber network, which increases tear strength, tensile modulus, preserves dimensional stability of the end product, and reduces fiber shedding. Advantageously, incorporation of binder fibers can allow bulk density to be reduced while preserving structural integrity of the non-woven core layer, which in turn decreases both weight and thermal conductivity.

The reinforcing fibers can have any suitable diameter to impart sufficient loft, compressibility, and/or tear resistance to the thermal insulator 100. The reinforcing fibers can have an average fiber diameter of from 10 micrometers to 1000 micrometers, 15 micrometers to 300 micrometers, 20 micrometers to 100 micrometers, or in some embodiments, less than, equal to, or greater than 10 micrometers, 15, 20, 25, 30, 35, 40, 45, 50, 60, 70, 80, 90, 100, 120, 150, 170, 200, 250, 300, 400, 500, 750, or 1000 micrometers.

The reinforcing fibers can be present in an amount of from 1 wt % to 40 wt %, 3 wt % to 30 wt %, 3 wt % to 19 wt %, or in some embodiments, equal to or greater than 0 wt %, or less than, equal to, or greater than 1 wt %, 2, 3, 4, 5, 7, 10, 15, 20, 25, 30, 35, 40, 45, or 50 wt %.

Preferred weight ratios of the oxidized polyacrylonitrile fibers to reinforcing fibers bestow both high tensile strength to tear resistance to the thermal insulator as well as acceptable flame retardancy—for instance, the ability to pass the UL-94V0 flame test. The weight ratio of oxidized polyacrylonitrile fibers to reinforcing fibers can be at least 4:1, at least 5:1, at least 10:1, or in some embodiments, less than, equal to, or greater than 4:1, 5:1, 6:1, 7:1, 8:1, 9:1, or 10:1.

By so reducing the overall effects of thermal conduction and convection, it is possible to achieve surprisingly low thermal conductivity coefficients. The non-woven core layer of the provided thermal insulators can display a thermal conductivity coefficient of less than 0.035 W/K-m, less than 0.033 W/K-m, less than 0.032 W/K-m, or in some embodiments, less than, equal to, or greater than 0.031 W/K-m, 0.032, 0.033, 0.034, or 0.035 W/K-m, at ambient conditions according to ASTM D1518-85 (re-approved 2003). Thermal conductivity coefficients in these ranges can be obtained with the non-woven core layer in its relaxed configuration (i.e., uncompressed) or compressed to 20% of its original thickness based on ASTM D5736-95 (re-approved 2001).

As a further option, it is possible that the non-woven core layer includes a plurality of fibers that are neither oxidized polyacrylonitrile fibers nor reinforcing fibers having an outer surface comprised of a polymer with a melting temperature of from 100° C. to 300° C. Such fibers may include, for example, polyester fibers having a melting temperature exceeding 300° C. To maximize the flame retardancy of the thermal insulator, however, it is preferred that the oxidized polyacrylonitrile fibers represent over 85 vol %, over 90 vol %, or over 95 vol % of the plurality of fibers that do not have an outer surface comprised of a polymer with a melting temperature of from 100° C. to 300° C.

Optionally, the oxidized polyacrylonitrile fibers and reinforcing fibers are each crimped to provide a crimped configuration (e.g., a zigzag, sinusoidal, or helical shape). Alternatively, some or all of the oxidized polyacrylonitrile fibers and reinforcing fibers have a linear configuration. The fraction of oxidized polyacrylonitrile fibers, 208 and/or reinforcing fibers that are crimped can be less than, equal to, or greater than 5%, 10, 15, 20, 25, 30, 40, 50, 60, 70, 80, 90, or 100%. Crimping, which is described in more detail in European Patent No. 0 714 248, can significantly increase the bulk, or volume per unit weight, of the non-woven core layer.

Binders

The non-woven core layer optionally includes a binder to enable the edge sealing of the insulator. The binder can be disposed on the scrims and/or the non-woven core layer. The presence of the binder allows the peripheral edge of the scrim(s) to be edge sealed by melting at least part of the binder.

The binder can take many forms. In some embodiments, the binder is provided through inclusion of binder fibers as described above. Useful binder fibers can include bicomponent fibers, including melty fibers, or monocomponent fibers. As an example, a suitable bicomponent fiber could include a polyester or nylon core with a low melting polyolefin sheath. As a further example, the bicomponent fiber could have a polyester core with a polyester-polyolefin copolymer sheath such as Type 254 CELBOND fiber provided by KoSa, Houston, Tex. This fiber has a sheath component with a melting temperature of approximately 230° F. (110° C.). The binder fibers can also be a polyester homopolymer or copolymer rather than a bi-component fiber.

Suitable monocomponent fibers include thermoplastic fibers with softening temperature less than 150° C. (such as polyolefin or nylon). Other suitable monocomponent fibers include thermoplastic fibers with softening temperature less than 260° C. (such as certain polyester fibers). For enhanced loft, it is beneficial for these binder fibers to be crimped, as mentioned above with respect to the reinforcing fibers.

Optionally, these binder fibers can also function as reinforcing fibers for the non-woven core layer. Alternatively, the binder fibers may be blended into the non-woven core layer as a separate component from the reinforcing fibers described in the previous section.

In other embodiments, the binder is provided by a coating. The coating can be disposed on the scrims, the non-woven core layer, or both. The coating can be applied using any known method, such as solution casting or hot melt coating. Useful solution casting methods including brush, bar, roll, wiping, curtain, rotogravure, spray, or dip coating techniques.

Coatings effective in edge sealing the thermal insulator include those made from an acrylic polymer latex or polyurethane based latex. Exemplary polymeric binders include Dow POLYCO 3103 (acrylic/vinyl acetate copolymer), Dow RHOPLEX HA-8, and DSM NEWREZ R-966 (polyurethane based latex). Other useful binder materials include fluorinated thermoplastics, optionally in the form of an aqueous emulsion, such as those provided under the trade designation THV and provided by 3M Company, St. Paul, Minn.

The latex can be cast onto the scrims and/or the non-woven core layer from an aqueous solution. The latex binder can be present in any suitable amount relative to the solids content of the aqueous solution. The latex binder can be present in an amount of from 1 wt % to 70 wt %, 3 wt % to 50 wt %, 5 wt % to 20 wt %, or in some embodiments, less than, equal to, or greater than 1 wt %, 2, 3, 4, 5, 7, 10, 12, 15, 17, 20, 25, 30, 35, 40, 45, 50, 55, 60, 65 or 70 wt % based on the overall solids weight of the coating.

The binder can also provide adhesion between the scrims and the non-woven core layer. This can be achieved by coating the binder onto inner surfaces of the scrim(s) before placing the scrims in contact with the non-woven core layer. Optionally, the binder can be spray coated onto these inner surfaces from solution.

The coating should be sufficiently thick to form an edge seal that is generally uniform and void-free when the scrims, and optionally the non-woven core layer, are subjected to heat and/or pressure. The minimum coating weight for a given application would depend on the porosity and thickness of the scrims and non-woven core layer, among other factors. In exemplary embodiments, the coating has a basis weight of from 2 gsm to 100 gsm, from 5 gsm to 50 gsm, from 10 gsm to 20 gsm, or in some embodiments, less than, equal to, or greater than 2 gsm, 3, 4, 5, 7, 10, 12, 15, 17, 20, 25, 30, 35, 40, 45, 50, 55, 60, 65, 70, 75, 80, 85, 90, 95, or 100 gsm.

It can be advantageous for the coating to contain other components in addition to the binder. For example, where the binder is not flame resistant, the coating can further include a flame retardant additive.

Flame tests conducted on these articles used to measure compliance with the UL94-V0 flammability standard revealed that thin sections in the thermal insulator are most vulnerable to burning. Further, edge sealing of the thermal insulator results in areas of reduced thickness. As a result, the addition of a flame retardant into the coating applied to edge sealed areas was found to have an especially significant effect in enhancing overall fire resistance. In certain embodiments, this modification enables the thermal insulator to pass the UL94-V0 flammability standard. Surprisingly, it was discovered that, in some embodiments, the multilayer thermal insulator as a whole can pass the UL94-V0 flammability standard, even when the non-woven core layer and the scrims individually cannot.

Useful flame retardant additives include phosphate-based additives, such as ammonium polyphosphate Ammonium polyphosphate is an inorganic salt of polyphosphoric acid and ammonia, and may be either a linear or branched polymer. Its chemical formula is $[NH_4PO_3]_n(OH)_2$, where each monomer consists of an orthophosphate radical of a phosphorus atom with three oxygens and one negative charge neutralized by an ammonium cation leaving two bonds free to polymerize. In the branched cases some monomers are missing the ammonium anion and instead link to other monomers. Organophosphates other than ammonium polyphosphate can also be used.

Other additives that can enhance fire resistance of the coating include intumescents, or substances that swell as a result of heat exposure. In the provided thermal insulators, an intumescent additive can include one or more of: (1) a phosphorus-containing part, provided for example by ammonium polyphosphate, (2) a hydroxyl-containing part that increases char in the event of a fire, such as sucrose, catechol, pentaerythritol ("PER"), and gallic acid, and (3) a nitrogen-containing part that can act as blowing agent, such as melamine or ammonium. In a preferred embodiment, components (1)-(3) are all used in combination. Intumescents can also include graphite filler, such as expandable graphite. Expandable graphite is a synthesized intercalation compound of graphite that expands when heated.

The flame retardant additive can be dissolved or dispersed with the binder in a common solvent and both components solution cast onto the scrims and/or the non-woven core layer. Conveniently, ammonium polyphosphate can be cast from an aqueous solution that also contains a polymer latex.

The flame retardant additive can be present in an amount of from 5 wt % to 95 wt %, from 10 wt % to 90 wt %, from 20 wt % to 60 wt %, or in some embodiments, less than, equal to, or greater than 5 wt % 10, 15, 20, 25, 30, 35, 40, 45, 50, 55, 60, 65, 70, 75, 80, 85, 90, or 95 wt % based on the overall solids weight of the coating.

The aqueous solution itself can have any suitable concentration to provide an appropriate viscosity for the selected coating method, and provide for a uniform coating on the fibers of the scrims and/or the non-woven core layer. For spray coating, it is typical to use a solids content of from 1 wt % to 50 wt %, from 2.5 wt % to 25 wt %, from 5 wt % to 15 wt %, or in some embodiments, less than, equal to, or greater than 1 wt %, 1.5, 2, 2.5, 3, 3.5, 4, 4.5, 5, 6, 7, 8, 9, 10, 12, 15, 17, 20, 25, 30, 35, 40, 45, or 50 wt %.

Scrims

The scrims referred to in FIGS. 1-3 are not particularly restricted, and can include any type of open mesh structure that is either woven or non-woven.

Woven scrims may have any type of weave, and non-woven scrims are produced using any well-known technique, including melt blowing, spun lace and spun bond techniques.

Non-woven scrims include those made from any of a broad variety of fibers including polyethylene fibers, polypropylene fibers, mixtures of polyethylene and polypropylene fibers, nylon fibers (such as the nylons described above), polyester fibers (such as the polyesters described above), acrylic and modacrylic fibers such as polyacrylonitrile fibers and acrylonitrile and vinylchloride copolymer fibers, polystyrene fibers, polyvinylacetate fibers, polyvinylchloride fibers, cellulose acetate fibers, glass fibers and viscose fibers. In addition to the above synthetic fibers there may also be used the natural fibers such as cotton or wool.

In the provided thermal insulators, suitable polymeric fibers used to produce the scrim include polyamides, polyesters and polyolefins, particularly polyethylene and polypropylene, or a combination thereof. The scrim may also contain fiberglass. In some embodiments, the open mesh fabric comprises at least one nylon, a high-density polyethylene or a combination thereof.

In various embodiments, each of the scrims is composed of flame resistant fibers. While fiberglass fibers have better intrinsic fire resistance than the aforementioned polymers, even combustible polymers can be provided with significant fire resistance by blending with sufficient amounts of a flame retardant additive. For example, these scrims can be made from flame-resistant polyester fibers.

The flame retardant additive can be either miscible or immiscible with the host polymer. Miscible additives include polymer melt additives such as phosphorus-based flame retardants that contain phenolic end groups. Polyphosphonates, including polyphosphonate homopolymers and copolymers, can also be miscibly blended with polyesters to form flame-resistant fibers. Useful additives are commercially available under the trade designation NOFIA from FRX Polymers, Inc., Chelmsford, Mass. Generally, miscible additives are preferred in making scrims with fine fiber diameters. If fiber diameters are larger than 10 microns, then inclusion of certain immiscible salts could also be used to enhance fire resistance.

Flame resistant fibers can be, in some embodiments, capable of passing the UL94-V0 flammability standard when formed into a non-woven web made from 100% of such fibers, and having a base weight of less than 250 gsm and web thickness of less than 6 millimeters.

Suitable scrims need not be fibrous. Scrims can, for example, include continuous films that are perforated to form a mesh-like structure. Useful scrims can be made from a perforated film, such as described in U.S. Pat. No. 6,617,002 (Wood), U.S. Pat. No. 6,977,109 (Wood), and U.S. Pat. No. 7,731,878 (Wood).

The scrims are generally much thinner than the non-woven core layer. To minimize the weight of the thermal insulator, the scrims can be made only as thick as necessary to serve the purpose of encapsulating loose fibers in the non-woven core layer while satisfying any technical requirements for strength and toughness. In a preferred embodiment, one or both scrims have a basis weight of from 10 gsm to 100 gsm, from 20 gsm to 80 gsm, from 30 gsm to 70 gsm, or in some embodiments, less than, equal to, or greater than 10 gsm, 12, 15, 17, 20, 25, 30, 35, 40, 45, 50, 55, 60, 65, 70, 75, 80, 85, 90, 95, or 100 gsm.

Further variants are possible. For example, the fibers in the non-woven core layer and/or scrim can be coated with other compositions that are not binders. The coating on the fibers can be selected from, for example, silicones, acrylates, and fluoropolymers whereby the non-woven core layer has an emissivity of less than 0.5. Here, "emissivity" is defined as the ratio of the energy radiated from a material's surface to that radiated from a blackbody (a perfect emitter) at the same temperature and wavelength and under the same viewing conditions. Reducing emissivity helps lower the extent to which a material loses heat from thermal radiation.

Coating the constituent fibers of the non-woven core layer can impart significant functional and/or aesthetic benefits. For example, coating the fibers has the effect of reinforcing the fibers, thus increasing the overall strength of the web. Certain coating materials, such as fluoropolymers and silicones, may enhance resistance to staining or fouling because of airborne substances becoming adhered to fiber surfaces. In some applications it can be desirable to sheath the fibers in an opaque coating, can also be used to change the color of the non-woven core layer, which would be generally be black or grey for oxidized polyacrylonitrile fibers or other carbonized fibers.

The non-woven core layers in FIGS. 1-3 can have any suitable thickness based on the space allocated for a given application. As a thermal insulator used in an electric vehicle compartment, the non-woven core layers can have a thickness of from 1 millimeter to 50 millimeters, from 2 millimeters to 25 millimeters, from 3 millimeters to 20 millimeters, or in some embodiments, less than, equal to, or greater than 1 millimeter, 2, 3, 4, 5, 6, 7, 8, 9, 10, 12, 15, 17, 20, 22, 25, 27, 30, 35, 40, 45, or 50 millimeters.

Methods of Manufacture

The provided thermal insulators can be made in a variety of ways, including batch methods and continuous methods.

Figure 4:
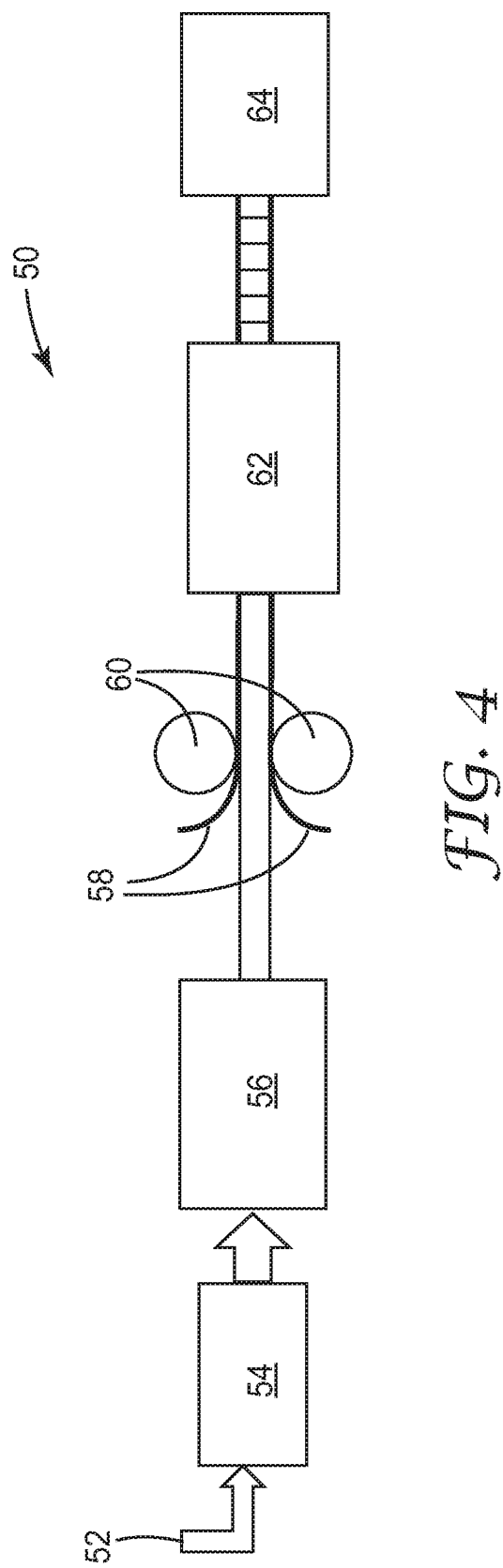
FIG. 4 is a schematic diagram of an exemplary method of making the multilayer thermal insulator.

FIG. 4 is diagram of a workflow 50 that illustrates an exemplary continuous manufacturing method. The workflow begins with the material inputs represented by block arrow 52, which feed into a carding process represented by block 54.

Material inputs include non-meltable polymeric fibers of the non-woven core layer, such as OPAN fibers. The non-meltable fibers can be blended with optional reinforcing fibers and/or binder fibers, such as a high temperature polyester fiber. In an exemplary process, OPAN fibers are blended with a high temperature polyethylene terephthalate staple fiber and carded to form a non-woven core layer having a thickness of about 8 mm.

Referring again to FIG. 4, the top and bottom major surfaces of the web are then spray coated with a binder solution in block 56. Dispersed in the solution is a polymeric binder and optionally a soluble flame retardant additive to improve the fire resistance of the coating. Based on environmental, health, and safety factors, it can be advantageous to use an aqueous binder solution, and avoid the need for volatile organic solvents. In alternative embodiments, the spray coating is applied only to the top or only to the bottom major surface of the web.

The spray coating step of block 56 can result in the binder solution penetrating deeply into the non-woven core layer, depending on the spraying technique, size of the spray droplets and thickness of the layer. In some embodiments, the depth of penetration is 100%, or greater than, equal to, or less than 95%, 90, 85, 80, 75, 70, 65, 60, 55, or 50%, relative to the thickness of the non-woven core layer.

The coated web can then be guided between scrims 58, 58 and all three layers conveyed between nip rolls 60, 60. When the layers come together, the binder solution may penetrate slightly into one or both scrims, and thus provide some degree of adhesion when the coating is dried. It can be advantageous for the binder solution not to completely penetrate through either scrim, since this could cause the outer surface of the thermal insulator to stick to tooling when edge sealed.

In block 62, the scrims and coated non-woven core layer are subjected to an entangling process. The entangling process can be, for example, a needle tacking or hydroentangling process. The output of this process step is a multilayered construction where the fibers of the scrims and the core layer are substantially entangled with each other along directions perpendicular to a major surface of the non-woven core layer.

Finally, in block 64, the coated and entangled web is heated in an oven to dry the coated fibers. Preferably, this step removes substantially all residual solvent introduced into the web from the fiber coating process in block 56. The end product of this workflow is an open-edged thermal insulator that can be stored in roll form and is capable of being edge sealed by a converter or end user.

Optionally, entangling step of block 62 can take place at another stage of the workflow 50. For example, this step can be take place immediately before the spray coating step of block 56 so that the binder solution does not contaminate the barbed needles used in needle tacking. A disadvantage of this modified workflow is that only the core layer will be entangled rather than all three layers. As another possibility, the entangling step of block 62 can be moved later so that it occurs after the drying step of block 64. By drying the web prior to entanglement, the problem of needle contamination can also be mitigated.

Edge sealing can be achieved using any number of useful methods. One method involves direct application of heat and pressure simultaneously by placing the open-edged thermal insulator in contact with a tool having one or more heated surfaces. In some embodiments, the surfaces are metal tool surfaces.

Instead of using a heated tool, it is possible to heat one or both major surfaces of the open-edged thermal insulator immediately prior to pressing it between unheated tool surfaces to edge seal the insulator. Such heat can be imparted by heated air (e.g., by convective heating) or by exposure to light (e.g., radiative heating). In some embodiments, the scrim surfaces are joined together using ultrasonic heating.

After edge sealing, it is generally desirable for the sealed thermal insulator to be cleanly removable from the tool surfaces. Clean removal can be facilitated by judicious selection of the binder. To avoid sticking issues, it is preferred that the softening temperature (e.g., $T_g$) of the binder is well below the softening point of the scrim. If the scrim is made from a semi-crystalline polymer such as a polyester, this softening temperature can correspond to its melting temperature. Using an edge seal temperature well below the melting temperature of the scrim also helps avoid inducement of brittleness in the scrim that can result from melting and re-crystallization in the fiber polymer.

To further improve the quality of the release, the outer surface of the scrims may be treated with a silicone.

While not intended to be limiting, further exemplary embodiments are enumerated as follows:

1. A multilayer thermal insulator comprising: a non-woven core layer comprising non-meltable, flame-resistant polymeric fibers; and one or more scrims disposed on opposing major surfaces of the non-woven core layer, wherein a peripheral edge of the one or more scrims is either edge sealed or capable of being edge sealed to substantially encapsulate the non-woven core layer within the one or more scrims.
2. The multilayer thermal insulator of embodiment 1, wherein the non-meltable polymeric fibers comprise carbon fiber, carbon fiber precursor, or combination thereof
3. The multilayer thermal insulator of embodiment 2, wherein the carbon fiber, carbon fiber precursor, or combination thereof comprises oxidized polyacrylonitrile, dehydrated cellulosic precursors, or a pitch-based precursor.
4. The multilayer thermal insulator of any one of embodiments 1-3, further comprising a binder disposed on the scrims and/or the non-woven core layer, wherein the peripheral edge is either edge sealed or capable of being edge sealed by melting at least part of the binder.
5. The multilayer thermal insulator of embodiment 4, wherein the one or more scrims comprises a pair of scrims.
6. The multilayer thermal insulator of embodiment 4 or 5, wherein the binder is provided by secondary fibers dispersed in the non-woven core layer.
7. The multilayer thermal insulator of embodiment 4 or 5, wherein the binder is provided by a coating disposed on the one or more scrims and/or non-woven core layer.
8. The multilayer thermal insulator of embodiment 7, wherein the coating comprises a polymer latex.
9. The multilayer thermal insulator of embodiment 7 or 8, wherein the binder is present in an amount of from 10 wt % to 90 wt % based on the overall solids weight of the coating.
10. The multilayer thermal insulator of embodiment 9, wherein the binder is present in an amount of from 25 wt % to 75 wt % based on the overall solids weight of the coating.
11. The multilayer thermal insulator of embodiment 10, wherein the binder is present in an amount of from 30 wt % to 60 wt % based on the overall solids weight of the coating.
12. The multilayer thermal insulator of any one of embodiments 7-11, wherein the coating further comprises a flame retardant additive.
13. The multilayer thermal insulator of embodiment 12, wherein the flame retardant additive comprises ammonium polyphosphate.
14. The multilayer thermal insulator of embodiment 12 or 13, wherein the flame retardant additive is present in an amount of from 10 wt % to 90 wt % based on the overall solids weight of the coating.
15. The multilayer thermal insulator of embodiment 14, wherein the flame retardant additive is present in an amount of from 25 wt % to 75 wt % based on the overall solids weight of the coating.
16. The multilayer thermal insulator of embodiment 15, wherein the flame retardant additive is present in an amount of from 40 wt % to 60 wt % based on the overall solids weight of the coating.

17. The multilayer thermal insulator of any one of embodiments 1-16, wherein the non-meltable polymeric fibers are present in an amount of from 30 wt % to 100 wt %, based on the overall weight of the non-woven core layer.
18. The multilayer thermal insulator of embodiment 17, wherein the non-meltable polymeric fibers are present in an amount of from 50 wt % to 90 wt %, based on the overall weight of the non-woven core layer.
19. The multilayer thermal insulator of embodiment 18, wherein the non-meltable polymeric fibers are present in an amount of from 60 wt % to 80 wt %, based on the overall weight of the non-woven core layer.
20. The multilayer thermal insulator of any one of embodiments 1-19, wherein the non-meltable polymeric fibers have an average fiber diameter of from 1 micrometers to 100 micrometers.
21. The multilayer thermal insulator of embodiment 20, wherein the non-meltable polymeric fibers have an average fiber diameter of from 5 micrometers to 50 micrometers.
22. The multilayer thermal insulator of embodiment 21, wherein the non-meltable polymeric fibers have an average fiber diameter of from 10 micrometers to 30 micrometers.
23. The multilayer thermal insulator of any one of embodiments 1-22, wherein the non-woven core layer has an average bulk density of from 5 $kg/m^3$ to 200 $kg/m^3$.
24. The multilayer thermal insulator of embodiment 23, wherein the non-woven core layer has an average bulk density of from 10 $kg/m^3$ to 100 $kg/m^3$.
25. The multilayer thermal insulator of embodiment 24, wherein the non-woven core layer has an average bulk density of from 20 $kg/m^3$ to 40 $kg/m^3$.
26. The multilayer thermal insulator of any one of embodiments 1-25, wherein the non-woven core layer further comprises reinforcing fibers each having an outer surface comprised of a polymer with a melting temperature of from 100° C. to 300° C.
27. The multilayer thermal insulator of embodiment 26, wherein the reinforcing fibers comprise polyester fibers.
28. The multilayer thermal insulator of any one of embodiments 26 or 27, wherein the reinforcing fibers are present in an amount of from 5 wt % to 50 wt %, based on the overall weight of the non-woven core layer.
29. The multilayer thermal insulator of embodiment 28, wherein the reinforcing fibers are present in an amount of from 10 wt % to 40 wt %, based on the overall weight of the non-woven core layer.
30. The multilayer thermal insulator of embodiment 29, wherein the reinforcing fibers are present in an amount of from 15 wt % to 30 wt %, based on the overall weight of the non-woven core layer.
31. The multilayer thermal insulator of any one of embodiments 26-30, wherein the reinforcing fibers have an average fiber diameter of from 10 micrometers to 1000 micrometers.
32. The multilayer thermal insulator of embodiment 31, wherein the reinforcing fibers have an average fiber diameter of from 15 micrometers to 300 micrometers.
33. The multilayer thermal insulator of embodiment 32, wherein the reinforcing fibers have an average fiber diameter of from 20 micrometers to 100 micrometers.
34. The multilayer thermal insulator of any one of embodiments 1-33, wherein the non-woven core layer contains fibers that are substantially entangled with each other along directions perpendicular to a major surface of the non-woven core layer.
35. The multilayer thermal insulator of embodiment 34, wherein the substantially entangled fibers are needle tacked.
36. The multilayer thermal insulator of any one of embodiments 1-35, wherein each scrim comprises flame-resistant polyester fibers.
37. The multilayer thermal insulator of any one of embodiments 1-36, wherein each scrim has a basis weight of from 10 gsm to 100 gsm.
38. The multilayer thermal insulator of embodiment 37, wherein each scrim has a basis weight of from 20 gsm to 80 gsm.
39. The multilayer thermal insulator of embodiment 38, wherein each scrim has a basis weight of from 30 gsm to 70 gsm.
40. The multilayer thermal insulator of any one of embodiments 4-39, wherein the binder is provided by a coating disposed on the one or more scrims and/or non-woven core layer and further wherein the coating has a basis weight of from 5 gsm to 100 gsm.
41. The multilayer thermal insulator of embodiment 40, wherein the coating has a basis weight of from 10 gsm to 50 gsm.
42. The multilayer thermal insulator of embodiment 41, wherein the coating has a basis weight of from 20 gsm to 40 gsm.
43. The multilayer thermal insulator of embodiment 1, wherein the peripheral edge is cold welded.
44. The multilayer thermal insulator of embodiment 1, wherein the peripheral edge is adhesively edge sealed.
45. The multilayer thermal insulator of any one of embodiments 1-44, wherein the peripheral edge includes both the non-woven core layer and the one or more scrims.
46. The multilayer thermal insulator of any one of embodiments 1-44, wherein the one or more scrims extend beyond the non-woven core layer such that the peripheral edge includes the scrims but excludes the non-woven core layer.
47. The multilayer thermal insulator of any one of embodiments 1-46, wherein an outer surface of the one or more scrims comprises a silicone.
48. The multilayer thermal insulator of any one of embodiments 1-47, wherein the multilayer thermal insulator passes the UL94-V0 flammability standard.
49. The multilayer thermal insulator of embodiment 1-48, wherein both the non-woven core layer and the one or more scrims individually do not pass the UL94-V0 flammability standard.
50. A battery assembly for an electric vehicle comprising the multilayer thermal insulator of any one of embodiments 1-49.
51. A method of making a multilayer thermal insulator containing a non-woven core layer comprising non-meltable, flame-resistant polymeric fibers, the method comprising: providing a scrim along each major surface of the non-woven core layer; and edge sealing a peripheral edge of the scrim(s) to substantially encapsulate the non-woven core layer within the scrim(s).
52. The method of embodiment 51, wherein each scrim is flame-resistant.
53. The method of embodiment 52, wherein each scrim comprises flame-resistant polyester fibers.
54. The method of any one of embodiments 51-53, wherein edge sealing the peripheral edge comprises: providing a binder on the scrim(s) and/or the non-woven core layer, and applying heat to melt the binder along the peripheral edge.

55. The method of embodiment 54, wherein disposing the binder on the scrim(s) and/or the non-woven core layer comprises spray coating the binder.
56. The method of embodiment 55, wherein the binder is sprayed onto inner surfaces of the scrim(s) for improved adhesion between the scrim(s) and non-woven core layer.
57. The method of any one of embodiments 54-56, wherein the binder comprises an acrylic polymer latex.
58. The method of any one of embodiments 54-57, wherein the binder comprises a flame retardant additive.
59. The method of embodiment 58, wherein the flame retardant additive comprises ammonium polyphosphate.
60. The method of any one of embodiments 55-59, wherein the binder is spray coated onto the scrim(s) and/or the non-woven core layer from an aqueous solution.
61. The method of embodiment 60, wherein the aqueous solution has a solids content of from 2 wt % to 50 wt %.
62. The method of embodiment 61, wherein the aqueous solution has a solids content of from 3 wt % to 30 wt %.
63. The method of embodiment 62, wherein the aqueous solution has a solids content of from 5 wt % to 20 wt %.
64. The method of any one of embodiments 51-63, wherein edge sealing the peripheral edge comprises pressing the peripheral edge between a pair of tool surfaces.
65. The method of embodiment 64, wherein at least one tool surface is a heated surface.
66. The method of embodiment 64, wherein heat is imparted to the peripheral edge by ultrasonic heating prior to pressing the peripheral edge.
67. The method of embodiment 64, wherein heat is imparted to the peripheral edge by convective heating prior to pressing the peripheral edge.
68. The method of embodiment 64, wherein heat is imparted to the peripheral edge by radiative heating prior to pressing the peripheral edge.
69. The method of any one of embodiments 64-68, further comprising cleanly removing the peripheral edge from the tool surfaces.
70. The method of any one of embodiments 51-69, wherein edge sealing the peripheral edge results in the peripheral edge being substantially solidified.
71. The method of any one of embodiments 51-70, wherein the peripheral edge includes both the non-woven core layer and the scrim(s).
72. The method of any one of embodiments 51-70, wherein each scrim extends beyond the non-woven core layer, whereby the peripheral edge includes the scrim but not the non-woven core layer.
73. The method of any one of embodiments 51-72, further comprising needle tacking the non-woven core layer.
74. The method of any one of embodiments 51-73, further comprising surface treating an outer surface of the scrim(s) with a silicone.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

TABLE 1

| Materials | | |
|---|---|---|
| Designation | Description | Source |
| OPAN 1 | Oxidized polyacrylonitrile staple fibers, 1.7 dTex available under the trade designation "OX" | Zoltek ™ Corporation (wholly owned subsidiary of Toray Group), Bridgeton, MO. |
| OPAN 2 | Oxidized polyacrylonitrile staple fibers, 1.2 dTex | LONGBANG Polymer Fiber Co., Ltd. |
| TREVIRA 270 | A flame retardant polyethylene terephthalate staple fiber, 6.5 dTex, available under the trade designation "TREVIRA 270" | Trevira GmbH, Hattersheim, Germany. |
| TREVIRA 276 | A flame retardant bicomponent staple fiber of copolyolefin, 3.3 dTex, available under the trade designation "TREVIRA 276" | Trevira GmbH, Hattersheim, Germany. |
| FR PET Scrim | A flame retardant polyethylene terephthalate scrim material (70% PET and 30% Rayon), 50 gsm | Precision Fabrics Group, Inc., Greensboro, NC. |
| FR PET Scrim with Adhesive | A flame retardant polyethylene terephthalate scrim material (70% PET and 30% Rayon) with a heat activated adhesive on one side, 70 gsm | Precision Fabrics Group, Inc., Greensboro, NC. |
| White PET Scrim | White polyester scrim: 16 gsm base weight, 3-mil thickness | HDK Industries Inc, Rogersville, TN. |
| B-15J | A spray coating formula including an acrylic latex binder, 5 wt. % solids, available under the trade designation "RHOPLEX B-15J" | Dow Chemical, Midland, MI. |
| HA-8 | Self-crosslinking aqueous acrylic emulsion available under the trade designation "RHOPLEX HA-8" | Dow Chemical, Midland, MI. |

TABLE 1-continued

Materials

| Designation | Description | Source |
|---|---|---|
| ST954 | Conventional self-crosslinking acrylic binder available under the trade designation "RHOPLEX ST954" | Dow Chemical, Midland, MI. |
| AP420 | A water-based short chain ammonium polyphosphate flame retardant additive available under the trade designation "EXOLIT AP 420" | Clariant Corp., Minneapolis, MN. |
| AP423 | A long-chain ammonium polyphosphate flame retardant additive, available under the trade designation "EXOLIT AP 423" | Clariant Corp., Minneapolis, MN. |
| SMC 688 | Cyclic phosphonate flame retardant available under the trade designation "SMC 688" | Special Materials Company, New York, NY. |
| FR CROS 634 | Water-based short chain ammonium polyphosphate available under the trade designation "FR CROS 634" | Budenheim, Budenheim, Germany. |
| Melamine | Melamine available under the trade designation "MELAMINEBYOCI" | OCI Nitrogen, Geleen, Netherlands. |
| EG249 | Expandable graphite flame retardant available under the trade designation "NYAGRAPH 249" | NYACOL, Ashland, MA. |
| AC-3 | Phosphate based halogen free fire retardant intumescent agent available under the trade designation "INTUMAX AC-3" | Broadview Technologies, Newark, NJ. |
| Sucrose | Sucrose, 99% | Alfa Aesar, Ward Hill, MA. |
| Catechol | 1,2 dihydroxybenzene, 99% | Alfa Aesar, Ward Hill, MA. |
| PER | Pentaerythritol, 98% | Alfa Aesar, Ward Hill, MA. |
| Gallic Acid | S-Allyl-L-cysteine | Sigma Aldrich, St. Louis, MO. |
| Lignin | Lignin, alkali (solid) | Sigma Aldrich, St. Louis, MO. |
| THV 340Z | Fluoropolymer resin in emulsion; 50% weight in water in solid content | 3M Company, Saint Paul, MN. |

Test Methods:

Surface Base Weight measurement: A section of nonwoven web was cut to 30.5 cm by 30.5 cm (12 inch by 12 inch) and was weighed. The weight, in grams, of the section divided by the surface area (0.0929 m$^2$) gave the surface base weight, reported in grams per square meter ("gsm").

Nonwoven Web Thickness Measurement: The method of ASTM D5736-95 was followed, according to test method for thickness of high loft nonwoven fabrics. The plate pressure was calibrated at 0.002 psi (13.790 Pascal).

Flame Test: FAR 25-853a and FAR 25-853b vertical burner. Reference to UL94-V0 standard with flame height 20-mm, bottom edge of the sample 10-mm into the flame and burn twice at 10 seconds each. A flame propagation height under 125-mm (5 inches) was considered a pass.

Preparatory Example 1

50-mm cut length 80% (by weight) OPAN 2 and 20% (by weight) TREVIRA 276 staple fibers were carded by passing the fibers through a Wave-Maker system from Santex AG to form a 150 gsm core web. The sample was oven activated at 150° C. to melt the high-temperature polyester fibers to bond the OPAN fibers, while maintaining the core web thickness at 6-mm. The sample underwent flame testing and the result is represented in Table 2.

Preparatory Example 2

50-mm cut length 80% (by weight) OPAN 2 and 20% (by weight) TREVIRA 276 staple fibers were carded by passing the fibers through a Wave-Maker system from Santex AG to form a 150 gsm core web. The core web was then conveyed to a Dilo Needle Loom, Model DI-LOOM OD-1 6 from Eberbach, Germany having a needleboard array of 23 rows of 75 needles/row where the rows are slightly offset to randomize the pattern. The needles were Foster 20 3-22-1.5B needles. The array was roughly 17.8 cm (7 inches) deep in the machine direction and nominally 61 cm (24 inches) wide with needle spacings of roughly 7.6-mm (0.30 inch). The needleboard was operated at 91 strokes/minute to entangle and compact the web to a roughly 5.1-mm (0.20 inch) thickness. The sample underwent flame testing and the result is represented in Table 2.

Preparatory Example 3

50-mm cut length 80% (by weight) OPAN 1 and 20% (by weight) TREVIRA 270 staple fibers were carded were carded by passing the fibers through a Wave-Maker system from Santex AG to form a 100 gsm, 8-mm core web. The sample was oven activated at 250° C. by a Desptach drying oven from Despatch of Minneapolis, Minn. to melt the high-temperature polyester fibers to bond the OPAN fibers, while maintaining the core web thickness at 8-mm. The sample underwent flame testing and the result is represented in Table 2.

Preparatory Example 4

50-mm cut length 80% (by weight) OPAN 1 and 20% (by weight) TREVIRA 270 staple fibers were carded by passing the fibers through a Wave-Maker system from Santex AG to form a 100 gsm, 8-mm web. The web was then needle tacked by a Dilo Needle Loom, Model DI-LOOM OD-1 6. The sample underwent flame testing and the result is represented in Table 2.

TABLE 2

Flame Test Results

| Description | Result of Flame Test |
| --- | --- |
| Preparatory Example 1 | Fail |
| Preparatory Example 2 | Fail |
| Preparatory Example 3 | Pass |
| Preparatory Example 4 | Pass |
| Example 1 | Pass |
| Example 2 | Pass |
| Example 3 | Pass |
| Example 4 | Pass |
| Example 5 | Pass |
| Example 6 | Pass |
| Example 7 | Fail |
| Example 8 | Fail |
| Example 9 | Fail |
| Example 10 | Fail |
| Example 11 | Pass |
| Example 12 | Pass |
| Example 13 | Pass |
| Example 14 | Fail |
| Example 15 | Pass |
| Example 16 | Pass |
| Example 17 | Pass |
| Example 18 | Pass |
| Example 19 | Pass |
| Example 20 | Pass |
| Example 21 | Pass |
| Example 22 | Pass |
| Example 23 | Pass |
| Example 24 | Pass |
| Example 25 | Pass |
| Example 26 | Pass |
| Comparative Example 1 | Fail |
| Comparative Example 2 | Fail |
| Comparative Example 3 | Fail |
| Comparative Example 4 | Fail |

Examples 1 and 2

FR PET Scrims were placed on both sides of the core webs created from Preparatory Example 1. The core webs were quilted via needle tack by hand. The samples underwent flame testing and the results are represented in Table 2.

Examples 3 and 4

FR PET Scrims were placed on both sides of core web samples created in Preparatory Examples 3 and 4. The core webs were quilted via needle tack by hand. The samples underwent flame testing and the results are represented in Table 2.

Examples 5 and 6

FR PET Scrims with Adhesive were placed on both sides of core web samples created in Preparatory Examples 3 and 4. The core webs were quilted via needle tack by hand. The samples underwent flame testing and the results are represented in Table 2.

Examples 7 and 8

Using samples created in Examples 1 and 2, the edges were sealed using a PHI Model 0238-H hot press by placing the web between two 10.2 cm by 17.8 cm (4 inch by 7 inch) aluminum plates. The edges of the web were hot pressed to a thickness of 0.6-mm at 150° C. (302° F.) and 2.7 MPa for 2.5 minutes. The samples underwent flame testing and the results are represented in Table 2.

Examples 9 and 10

Core webs from Preparatory Examples 3 and 4 were die cut to a 27.9 cm×27.9 cm (11 in×11 in) square using an Atom SE231 press and knife cutter from MS (Manufacturers Supplies Co.) of Springfield, N.H. Two FR PET Scrims with adhesive were die cut to a 30.5 cm×30.5 cm (12 in×12 in square). The FR PET Scrims were then stacked above and below the core web with 1.3 cm (0.5 in) of the scrim overlapping the core web on all four sides and the adhesive layer facing the core. The edges of the samples were then hot pressed by a PHI Model 0238-hot press and sealed by placing the samples between aluminum plates that matched the converted scrim size (27.9 cm×27.9 cm (11 in×11 in)). The edges of the web were hot pressed to a thickness of 0.2-mm at 140° C. (280° F.) and 2.7 MPa for 2.5 minutes. The samples underwent flame testing and the results are represented in Table 2.

Examples 11 and 12

The edges of the samples created in Examples 3 and 4 were dipped into a 10% solid content THV formulation. The formulation was made by mixing one-part of THV340z at 50% solid content with four parts of water to make 10% solid content. The samples were then placed into a 150° C. Despatch drying oven from Despatch of Minneapolis, Minn. for three minutes to dry. The samples underwent flame testing and the results are represented in Table 2.

Example 13

A powder spray gun obtained from ECOSS Inc (through Amazon.com), of Tampa, Fla. was used to spray a 5% a coating of solid content THV 340Z onto the top and bottom of the core web created in Preparatory Example 3. The formulation was made by mixing one-part THV340Z at 50% solid content with nine (9) parts of water to make 5% solid content. The sample was placed into a 150° C. Despatch drying oven from Despatch of Minneapolis, Minn. for five minutes to dry. The sample underwent flame testing and the result is represented in Table 2.

Example 14

A powder spray gun obtained from ECOSS Inc (through Amazon.com), of Tampa, Fla. was used to spray a coating of 5% solid content B-15J onto top and bottom of the core web created by Preparatory Example 3. The formulation was made by mixing one-part B-15J at 50% solid content with nine (9) parts of water to make 5% solid content. The sample was placed into a 150° C. Despatch drying oven from Despatch of Minneapolis, Minn. for three minutes to dry. The sample underwent flame testing and the result is represented in Table 2.

Example 15

A core web was created by Preparatory Example 3. 5% B-15J was mixed with 10% AP420 using a DAC150 speed mixer from FlackTek Inc of Landrum, S.C. to create a 300 gsm mixture (with 5% B15 and 10% AP420). The mixture was sprayed onto the core web using a powder spray gun obtained from ECOSS Inc (through Amazon.com), of Tampa, onto the top and bottom of the core web resulting in a surface. Two FR PET Scrims were placed on the top and bottom layers of the core web. The sample was placed into a 150° C. Despatch drying oven from Despatch of Minneapolis, Minn. for five minutes to dry. The web was then passed needle tacked by a Dilo Needle Loom, Model DI-LOOM OD-1 6. The edges were sealed using a PHI Model 0238-H hot press by placing the web between two 10.2 cm by 17.8 cm (4 inch by 7 inch) aluminum plates. The edges of the web were hot pressed to a thickness of 0.6-mm at 171° C. (340° F.) and 2.7 MPa for 2.5 minutes. The sample underwent flame testing and the result is represented in Table 2.

Example 16

A core web was created by Preparatory Example 3. 5% B-15J was mixed with 10% AP420 using a DAC150 speed mixer from FlackTek Inc of Landrum, S.C. to create a 300 gsm mixture (with 5% B15 and 10% AP420). The mixture was sprayed onto the core web using a powder spray gun obtained from ECOSS Inc (through Amazon.com), of Tampa, onto the top and bottom of the core web resulting in a surface. Two White PET Scrims were applied by nip rolling over the coatings on the top and bottom of the core web. The sample was placed into a 150° C. Despatch drying oven from Despatch of Minneapolis, Minn. for five minutes to dry. The web was then passed needle tacked by a Dilo Needle Loom, Model DI-LOOM OD-1 6. The edges were sealed using a PHI Model 0238-H hot press by placing the web between two 10.2 cm by 17.8 cm (4 inch by 7 inch) aluminum plates. The edges of the web were hot pressed to a thickness of 0.4-mm at 171° C. (340° F.) and 2.7 MPa for 2.5 minutes. The edges of the web were hot pressed to a thickness of 0.4-mm at 171° C. (340° F.) and 10.8 MPa for 2.5 minutes. The sample underwent flame testing and the result is represented in Table 2.

Examples 17-26 and Comparative Examples 1-4

Core webs were created by Preparatory Example 3. Two White PET Scrims were placed on the top and bottom layers of each of the core webs. Formulations represented in Table 3 were spray coated onto the FR PET scrims that were created by Preparatory Example 5. Coatings were applied using a powder spray gun obtained from ECOSS Inc (through Amazon.com), of Tampa, Fla. The formulas were mixed with a DAC150 speed mixer from FlackTek Inc of Landrum, S.C. In Examples 21, 22, and 24 only, the edges were sealed using a PHI Model 0238-H hot press by placing the web between two 10.2 cm by 17.8 cm (4 inch by 7 inch) aluminum plates. The edges of the web were hot pressed to a thickness of 0.4-mm at 171° C. (340° F.) and 2.7 MPa for 2.5 minutes. Otherwise, the White PET Scrims were clipped to the core webs. The samples underwent flame testing and the results are represented in Table 2.

TABLE 3

| Coating Formulations | | |
| --- | --- | --- |
| Description | Composition | Weight (grams) |
| Example 17 | AP 420 | 40 |
| | Water | 40 |
| | PER | 9.6 |
| Example 18 | FR CROS 634 | 80 |
| | Water | 80 |
| | Sucrose | 20 |
| Example 19 | AP 420 | 80 |
| | Water | 80 |
| | Catechol | 10 |
| | Melamine | 0.5 |
| Example 20 | Water | 4 |
| | SMC 688 | 1 |
| Example 21 | FR CROS 634 | 12 |
| | Sucrose | 4 |
| | HA-8 | 0.5 |
| | Water | 20 |
| Example 22 | AP 420 | 12 |
| | Sucrose | 4 |
| | HA-8 | 0.5 |
| | Water | 20 |
| Example 23 | AP 423 | 8 |
| | Sucrose | 4 |
| | HA-8 | 7 |
| | Water | 20 |
| Example 24 | HA-8 | 5 |
| | EG249 | 1 |
| Example 25 | AP 423 | 8 |
| | Gallic Acid | 4 |
| | HA-8 | 7 |
| | Water | 20 |
| Example 26 | AP 423 | 8 |
| | Lignin | 4 |
| | HA-8 | 7 |
| | Water | 20 |
| Comparative Example 1 | AC-3 | 8 |
| | Sucrose | 4 |
| | HA-8 | 7 |
| | Water | 20 |
| Comparative Example 2 | AP 423 | 4 |
| | Sucrose | 3 |
| | HA-8 | 7 |
| | Water | 20 |
| Comparative Example 3 | AP 423 | 8 |
| | Sucrose | 4 |
| | B-15J | 7 |
| | Water | 20 |
| Comparative Example 4 | AP 423 | 8 |
| | Sucrose | 4 |
| | ST954 | 7 |
| | Water | 20 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given to enable one of ordinary skill in the art to practice the claimed disclosure, is not to be construed as limiting the scope of the disclosure, which is defined by the claims and all equivalents thereto.

What is claimed is:

1. A multilayer thermal insulator comprising:
   a non-woven core layer comprising non-meltable, flame-resistant fibers that comprise carbon fibers and binder fibers; and
   one or more scrims disposed on opposing major surfaces of the non-woven core layer,
   wherein a peripheral edge of the one or more scrims is edge sealed to substantially encapsulate the non-woven core layer within the one or more scrims, the non-meltable, flame-resistant fibers and binder fibers in the non-woven core layer being substantially entangled along directions perpendicular to the opposing major surfaces of the non-woven core layer.

2. The multilayer thermal insulator of claim 1, further comprising a binder disposed on the scrims and/or the non-woven core layer, wherein the peripheral edge is either edge sealed or capable of being edge sealed by melting at least part of the binder.

3. The multilayer thermal insulator of claim 2, wherein the binder is provided by a coating disposed on the one or more scrims and/or non-woven core layer.

4. The multilayer thermal insulator of claim 3, wherein the coating comprises a polymer latex.

5. The multilayer thermal insulator of claim 3, wherein the coating further comprises a flame retardant additive.

6. The multilayer thermal insulator of claim 5, wherein the flame retardant additive comprises ammonium polyphosphate.

7. The multilayer thermal insulator of claim 1, wherein the non-woven core layer further comprises reinforcing fibers each having an outer surface comprised of a polymer with a melting temperature of from 100° C. to 300° C.

8. The multilayer thermal insulator of claim 1, wherein each scrim comprises flame-resistant polyester fibers.

9. The multilayer thermal insulator of claim 1, wherein the peripheral edge includes both the non-woven core layer and the one or more scrims.

10. The multilayer thermal insulator of claim 1, wherein the one or more scrims extend beyond the non-woven core layer such that the peripheral edge includes the scrims but excludes the non-woven core layer.

11. A battery assembly for an electric vehicle comprising the multilayer thermal insulator of claims 1.

12. The multilayer thermal insulator of claim 1, wherein the binder fibers are crimped.

13. A method of making a multilayer thermal insulator containing a non-woven core layer comprising non-meltable, flame-resistant fibers and binder fibers, the method comprising:
    providing a scrim along each major surface of the non-woven core layer; and
    edge sealing a peripheral edge of the scrim(s) to substantially encapsulate the non-woven core layer within the scrim(s), wherein the non-meltable, flame-resistant fibers comprise carbon fibers and further wherein the non-meltable, flame-resistant fibers and binder fibers in the non-woven core layer are substantially entangled along directions perpendicular to the opposing major surfaces of the non-woven core layer.

14. The method of claim 13, wherein each scrim comprises flame-resistant polyester fibers.

15. The method of claim 13, wherein edge sealing the peripheral edge comprises:
    providing a binder on the scrim(s) and/or the non-woven core layer, and
    applying heat to melt the binder along the peripheral edge.

16. The method of claim 13, wherein the binder fibers are crimped.

* * * * *

UNITED STATES PATENT AND TRADEMARK OFFICE
CERTIFICATE OF CORRECTION

PATENT NO. : 11,235,552 B2
APPLICATION NO. : 17/058258
DATED : February 1, 2022
INVENTOR(S) : Mingzhu Li Page 1 of 1

It is certified that error appears in the above-identified patent and that said Letters Patent is hereby corrected as shown below:

In the Claims

Column 27
Line 22, In Claim 3, before "non-woven", insert --the--.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*